(12) United States Patent
Flagg

(10) Patent No.: US 12,260,457 B2
(45) Date of Patent: Mar. 25, 2025

(54) SYSTEMS, METHODS, AND COMPUTER PROGRAM PRODUCTS FOR CREATING AND MAINTAINING A DIGITAL CURRENCY BASED ON SOCIETAL CONTRIBUTIONS

(71) Applicant: Scott A. Flagg, Ellsworth, ME (US)

(72) Inventor: Scott A. Flagg, Ellsworth, ME (US)

( * ) Notice: Subject to any disclaimer, the term of this patent is extended or adjusted under 35 U.S.C. 154(b) by 0 days.

(21) Appl. No.: 17/930,543

(22) Filed: Sep. 8, 2022

(65) Prior Publication Data

US 2024/0087014 A1 Mar. 14, 2024

(51) Int. Cl.
*G06Q 40/04* (2012.01)
(52) U.S. Cl.
CPC ..................... *G06Q 40/04* (2013.01)
(58) Field of Classification Search
CPC ........................................ G06Q 40/04
See application file for complete search history.

(56) References Cited

U.S. PATENT DOCUMENTS

| | | | |
|---|---|---|---|
| 7,383,230 B2 | 6/2008 | Wolff | |
| 8,757,482 B2 | 6/2014 | Abecassis et al. | |
| 9,901,833 B2 | 2/2018 | Mooney et al. | |
| 10,548,022 B1 * | 1/2020 | Solé Simó | H04W 24/02 |
| 10,685,584 B2 | 6/2020 | Otsuka | |
| 11,049,157 B2 | 6/2021 | Isaacson et al. | |
| 11,520,779 B2 * | 12/2022 | Shi | G06F 16/27 |
| 2003/0233278 A1 | 12/2003 | Marshall | |
| 2014/0006135 A1 | 1/2014 | Vergun | |
| 2015/0149376 A1 | 5/2015 | Brazell | |
| 2015/0170112 A1 | 6/2015 | DeCastro | |
| 2015/0310426 A1 | 10/2015 | Samid | |
| 2015/0379590 A1 | 12/2015 | Michaels et al. | |
| 2016/0063440 A1 | 3/2016 | Webb | |
| 2017/0124647 A1 * | 5/2017 | Pierce | G06Q 40/04 |
| 2018/0189887 A1 * | 7/2018 | Goldstein | G06Q 20/06 |
| 2019/0005471 A1 | 1/2019 | Chandaria | |
| 2019/0139069 A1 | 5/2019 | Sandhu | |
| 2020/0097232 A1 * | 3/2020 | Nakahara | G06F 3/1222 |
| 2020/0111064 A1 * | 4/2020 | Spangenberg | G06F 16/28 |
| 2021/0016158 A1 | 1/2021 | Challan et al. | |

FOREIGN PATENT DOCUMENTS

| | | | |
|---|---|---|---|
| JP | 2006215779 A | * | 8/2006 |
| WO | WO-2020049442 A1 | * | 3/2020 |
| WO | WO-2020148659 A2 | * | 7/2020 |

OTHER PUBLICATIONS

Bossu et al.: Legal Aspects of Central Bank Digital Currency: Central Bank and Monetary Law Considerations, IMF Working Paper, WP/20/254, Nov. 2020, pp. 1-51 (Year: 2020).*
Silva et al.: A Systematic Review on Social Currency: A One-Dacade Perspective, May 3, 2022, Journal of Financial; Marketing , pp. 1-17 (Year: 2022).*

* cited by examiner

*Primary Examiner* — Bijendra K Shrestha
(74) *Attorney, Agent, or Firm* — Dunlap Bennett & Ludwig, PLLC

(57) ABSTRACT

Systems, methods, and computer program products for creating and maintaining an alternative digital currency is herein disclosed. The present invention provides a currency that values the specific nature of the work exchanged from one person to another. The present invention results in an exchange system that consciously shapes both societal interaction and also individual personal growth.

4 Claims, 6 Drawing Sheets

Individual Care Unit Transaction Submission

| Person | Date | Category of Work | Specific Category | Hours | Detail of Work | Care Units | Identifier | Recipient |
|---|---|---|---|---|---|---|---|---|
| John Smith | 6/21/2022 | Justice | Leadership | 8 | Managed crew operation on number six construction site. Oversaw all activities of 8 personnel including scheduling and jobs performed. | 500 | #1889762 | Lucy Lou |

FIG. 7

SYSTEMS, METHODS, AND COMPUTER PROGRAM PRODUCTS FOR CREATING AND MAINTAINING A DIGITAL CURRENCY BASED ON SOCIETAL CONTRIBUTIONS

BACKGROUND OF THE INVENTION

The present invention relates to alternative currency systems and, more particularly, to a digital currency platform (referred to herein as "Built with Love") whose principal value exists in the transformational process of purposeful living and societal contribution, and resultant systems and methods associated therewith.

Monetary exchange values the item of the exchange resulting in gross social inequalities and misaligned individual priorities. All current and previous monetary exchanges fail to value or cultivate specific qualities or areas of exchange. The value is placed on the item of exchange rather than on the fundamental type of transaction. These monetary systems have no inherent value to them.

As can be seen, there is a need for a novel currency that is based on the personal and societal value of the work exchanged between persons. The present invention also solves the difficult problem of shifting away from a monetary system with no true inherent value to an equitable exchange system with inherent meaning and purpose. The present invention includes, among other things, a personal, societal, and monetary, transformational process utilizing purposeful work and is recorded by unique digital currency and computer processes.

SUMMARY OF THE INVENTION

In one aspect of the present invention, a non-monetary digital currency system is disclosed that comprises: a central server; a plurality of user devices configured to communicate with the central server, each of the plurality of user devices configured to: receive, from a first user, a recordation that work has been completed for a second user, wherein the work is classified in one of six (or more) pre-determined categories; transmit the recordation to the central server, and wherein the central server is configured to: receive the recordation that work has been completed; transmit, as a payment, one or more non-monetary digital currency units from the second user to the first user based on the work completed; and record the non-monetary digital currency in the one of the six-predetermined categories. In certain embodiments, the non-monetary digital currency is works-based. In certain embodiments, the six pre-determined categories are: Wisdom, Courage, Humanity, Justice, Temperance, and Transcendence. In certain embodiments, for the first user, each of the six pre-determined categories is completable by receiving and transmitting a pre-determined number of the non-monetary digital currency units. In certain embodiments, the pre-determined number is ten thousand.

These and other features, aspects and advantages of the present invention will become better understood with reference to the following drawings, description, and claims.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, without departing from the scope of this disclosure.

FIG. 7 is an exemplary work submission in accordance with the embodiment of the present invention.

DETAILED DESCRIPTION OF THE INVENTION

Figure 1:
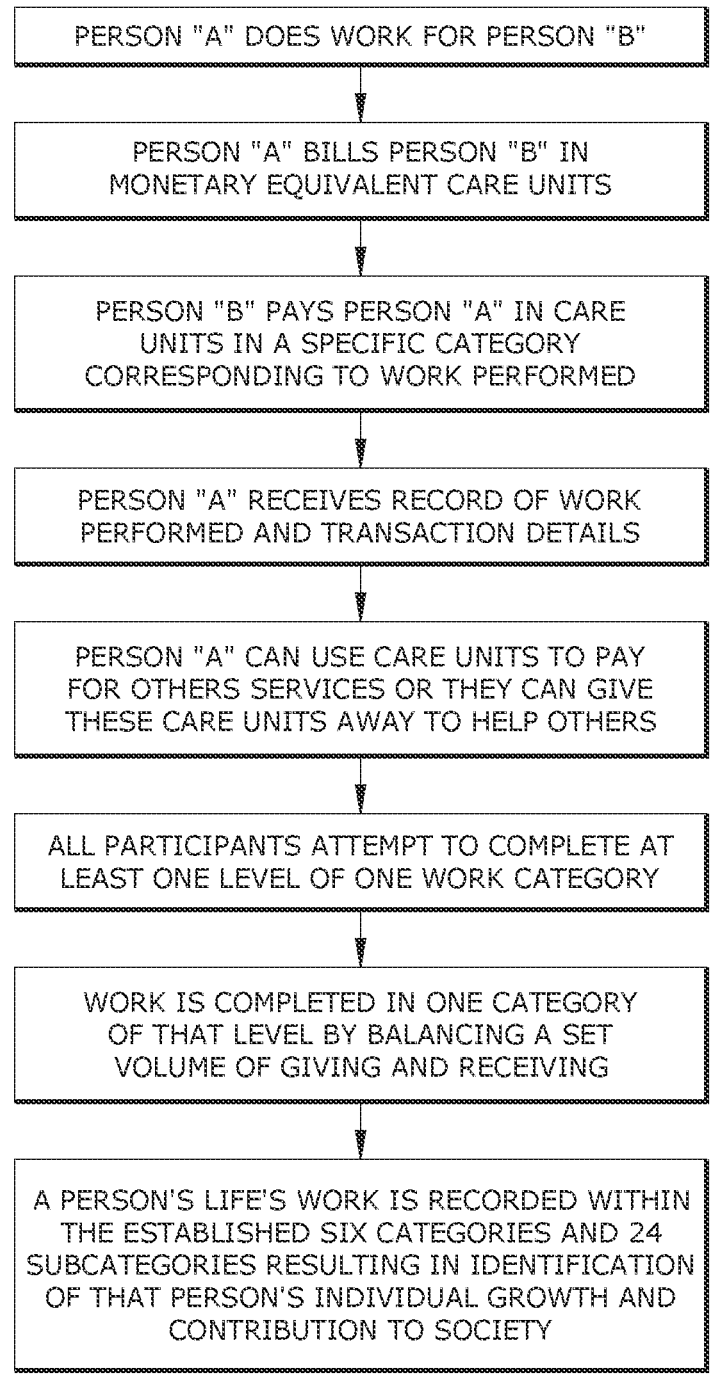
FIG. 1 is a flow chart of an individual exchange of work of an embodiment of the present invention.

With this overview in mind, and turning now to a more detailed discussion in conjunction with the attached figures, certain techniques of the present disclosure are illustrated as being implemented in a computing device such as a PC, laptop, tablet, smartphone or other device capable of executing computer-executed instructions stored on a non-transient medium, e.g., memory, such as RAM, ROM, EPROM, flash memory and so on. Thus, the execution of steps in a process flow is by way of computer-execution of such steps, e.g., via a processor configured to retrieve the corresponding instructions from memory and execute them.

The subject disclosure is described with reference to the drawings, wherein like reference numerals are used to refer to like elements throughout. In the following description, for purposes of explanation, numerous specific details are set forth in order to provide a thorough understanding of the present disclosure such that one skilled in the art will be enabled to make and use the present invention. It may be evident, however, that the present disclosure may be practiced without some of these specific details.

Broadly, one embodiment of the present invention is a non-monetary digital currency system that includes a central server; a plurality of user devices configured to communicate with the central server, each of the plurality of user devices configured to: receive, from a first user, a recordation that work has been completed for a second user, wherein the work is classified in one category of a pre-determined group of categories; transmit the recordation to the central server, and wherein the central server is configured to; receive the recordation that work has been completed; transmit, as a payment, one or more non-monetary digital currency units from the second user to the first user based on the work completed; record the non-monetary digital currency in the one category of the pre-determined group of categories.

Rather than valuing the item of exchange, embodiments of the present invention value the specific nature of the work exchanged from one person to another. The present invention results in an exchange system that consciously shapes both societal interaction and also individual personal growth. The present invention has the potential to transform individuals across their lifespan through the work they do, and society as a whole, based on this specific proposed modality of exchange. The presently disclosed method (and resultant systems) directly address the aforementioned issues by placing no inherent value in an object or token of exchange but rather by prioritizing the type of work exchanged that benefits both the individual and society. Each of the defined elements (discussed in greater detail below) is necessary and works synergistically.

Methods of the present invention include ones of purposeful global social construction intended to foster individual change resulting in a broader societal benefit. The present invention uniquely specifies defined categories of individual growth/work which, when performed and exchanged by persons, result in a defined valuing of actions (rather than fiat currency). Those categories are based on scientific research and have been validated by the Institute on Character. These categories are provided at the bottom of the present disclosure.

The present invention solves the difficult problem of shifting away from a monetary system with no true inherent value to an equitable exchange system with inherent meaning and purpose. The present invention uniquely links specific, and validated psychological principals of individual growth/work with desirable collective societal outcomes. The individual and society benefit from shared values, efforts and outcomes, by working towards the same goals.

Embodiments of the present invention are not limited by the creation of finite currency causing the exchange medium to become itself valued; rather, categories of work are specified that are of unlimited need and supply and therefore foster conditions for both individuals and society as a whole to reach its full potential. Further, the present invention recognizes that, as social beings, social valuing and acknowledgment of individual character strengths is the best way to define a person's personal work efforts and societal contributions. Fiat money can be attained through an almost infinite number of undesirable actions such as theft, misrepresentation, oppression, etc.

Additionally, the present invention takes into account and addresses the issue of persons who are incapable of traditional work and societal contribution whether due to mental health or physical health limitations. All persons can contribute to their own growth, and the growth of others, and therefore by default there is societal benefit through the proposed system.

In order to achieve the goals described above, provided herein are system, method and/or computer program product embodiments, and/or combinations and sub-combinations thereof, for creating and maintaining a digital currency system based on work or service provided from one individual to another. While the embodiments described herein are exemplified in the context of a works-based currency platform (referred to herein as "Built with Love", which is thus non-monetary), they are generally applicable to any currency system that assigns non-monetary value to actions.

Figure 5:
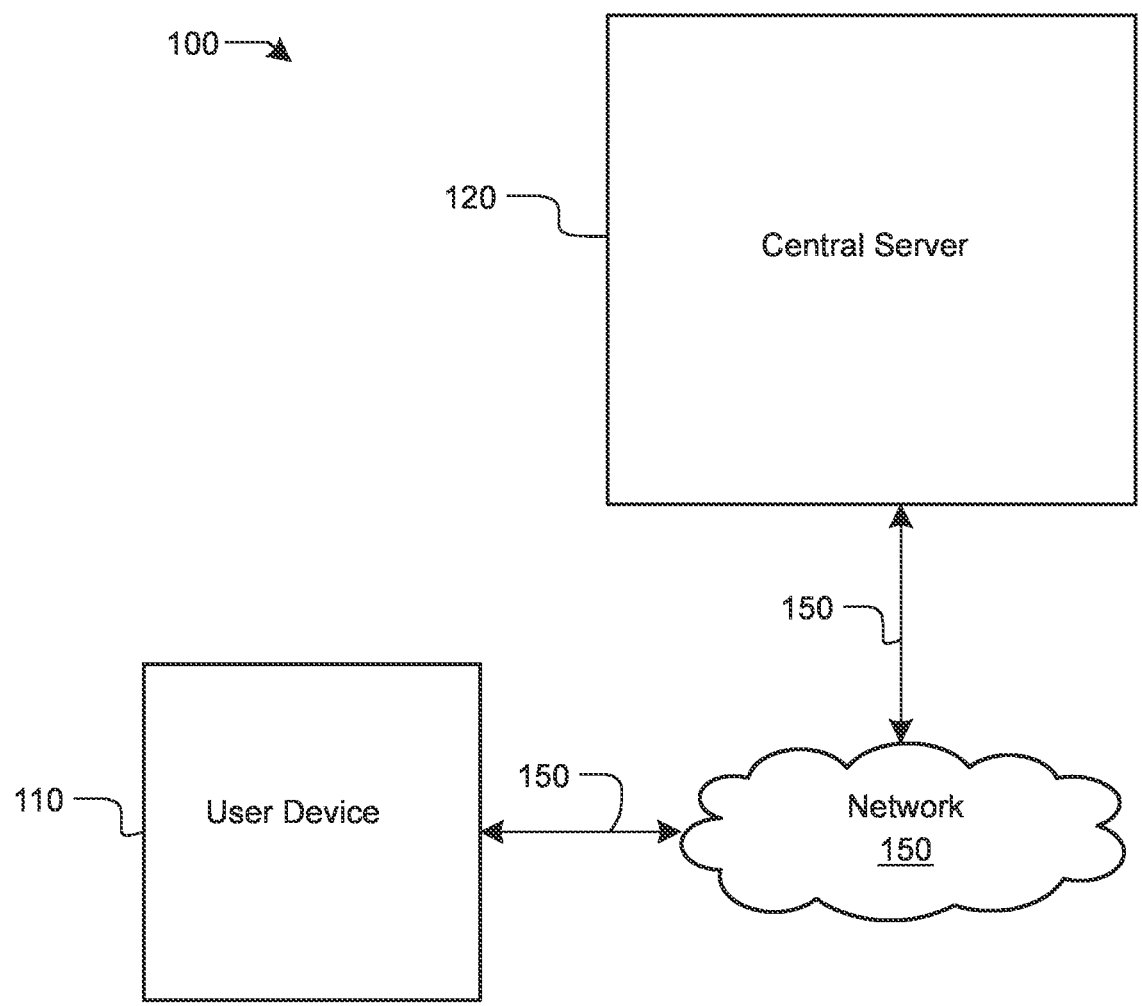
FIG. 5 is a system view of the embodiment of the present invention, showing the communication between a user device and a central server.

In accordance with the present invention, and as shown in FIG. 5, a system 100 is provided that includes a plurality of user devices 110, a central server 120, and a network 150 for allowing communication between the user devices 110 and central server 120. The central server 120 includes a computing system 200 which includes, among other things, a processor 202 and a memory 204 coupled to the processor 202. The processor 202 is configured to create finite units of a social currency, herein referred to as "care units". Each "care unit" has an approximate monetary value associated with it (for the sole purpose of transitioning from a fiat system to care units).

The Built with Love platform can be described as a transaction register and social platform to assess others' nature and quality of work. Its purpose is to both inspire individual use, track societal changes based on collective involvement, and serve as a record for individual transactions. There are 24 character strengths defined by the VIA (described in greater detail below). These are classified within six core strengths: Wisdom, Courage, Humanity, Justice, Temperance, and Transcendence. Upon initial implementation Care units hold a comparative monetary equivalency solely for the purpose of psychologically transitioning from traditional currency to the proposed Built with Love values based system. However, because Care units cannot be bought, sold, given away, inherited, stolen, or exchanged without merit, the units immediately loose many of the undesirable aspects of traditional currency and therefore are subsequently valued only upon the merit of the work performed, the individuals personal transformation from doing that work, and the resultant societal benefit of users continuing to perform valuable work in the world. A user performs or receives benefit from work and allocates a standardized number of Care units via the Built with love Platform in the following manner.

Each user device 110 runs a user application that connects to the central server 120 through the network 150. The network may be any communications network capable of transmitting data between computing devices, such as, but not limited to, a Wide Area Network (WAN), a Local Area Network (LAN), Personal Area Network (PAN), wireless networks, the Internet, overlay networks, satellite networks, or any combination thereof. The user device 110 may be any computing device suitable for interacting with the central server 120, such as, but not limited to, a personal computer, laptop computer, mobile computer, smartphone or other mobile phone, personal digital assistant (PDA), or tablet computing device. The central server 120 may be any computing device or combinations thereof adequate to provide functionality described herein, such as, but not limited to, web servers, application servers, server computers, database systems, or any combination thereof.

The central server 120 configured to generate and host portals that implement the methods of the present invention, such as a web-based portal or a website that documents and tracks transactions (described in greater detail below). Users register to gain access to the portal/website, and their account can be treated similar to a traditional bank account (which displays a balance of funds) to view a volume of exchanges in each category and also the balance of both giving and receiving units of the present invention. The portal/website serves as a front end (graphical user interface) for viewing transactions and accumulation of care units. Similarly, a mobile application platform may be hosted on the central server 120 and is configured to generate and host a mobile-based application that serves as the user front end after installed on a user device 110. A graphical user interface (GUI) may be generated by the central server 120 and the mobile application platform. The mobile application platform may implemented using any appropriate technology, such as ANDROID™ or iOS™.

Referring to FIG. 1, a flowchart generally depicting a process in accordance with the present invention is shown. A first person (Person "A") does some form of work for a second person (Person "B"). Afterwards, the first person bills the second person in "care units". The second person pays the first person in care units in a specific category corresponding to the work performed. The first person receives a record of the work performed and transaction details (FIG. 7 illustrates an example of this). The first person can use care units to pay for other's services, and they can also be given away to help others. By way of example, Person A submits via online portal to the Built with Love platform a record of work performed daily. This includes: Person, Date, Category of Work, Specific Category, Hours, Detail of Work, Care Units, Identifier, Recipient. Person B, the recipient of the work, uploads a similar corresponding register which is then correlated and validated by the Built with Love system allocating both giving and receiving units to the respective persons. Individuals can also submit care units to persons singularly without reciprocal detail verification, but rather acceptance confirmation. For example, person B, in the present example, may also award person A with a defined number of care units in the area of Creativity for the way in which they managed some situation or project. A person may receive no more than 500 care units in a 24 hour period, all work is valued on an equal monetary/care unit hourly scale to nullify any individual valuing of one type of work/growth/contribution over another. Care units are free (i.e., they are not limited) to give or receive as others can give freely for the work anyone might perform. Work will always be associated with any care units given or received. Care units are only units of recognition of work performed or received. They have no value in themselves and are only designators of actions performed within the aforementioned system of personal and societal valuing/growth. Each person has access to a limitless number of units they can give to others for appropriate work performed. Completion of categories within the six domains is noted once someone has given and received, for example, one million care units. Tracking may be continued at this point but nothing more is expected socially of this person.

Figure 2:
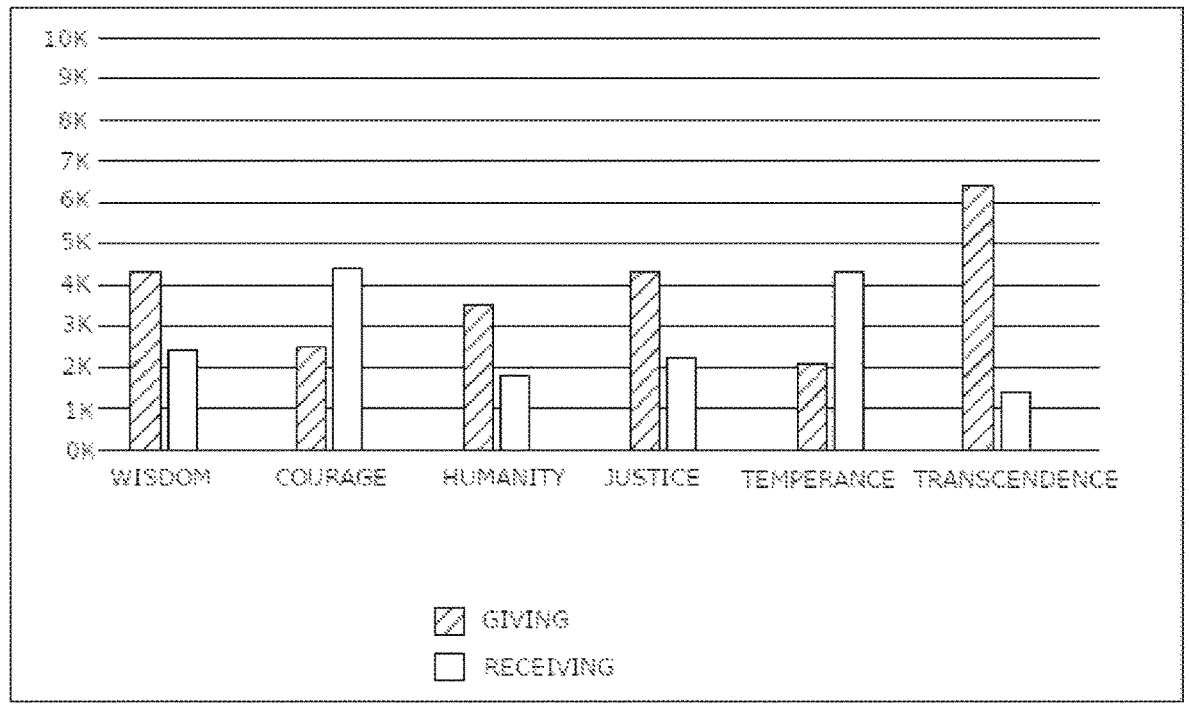
FIG. 2 is an exemplary online portal view of the six categories of work, in which a person attempts to complete an embodiment of the present invention.
Figure 3:
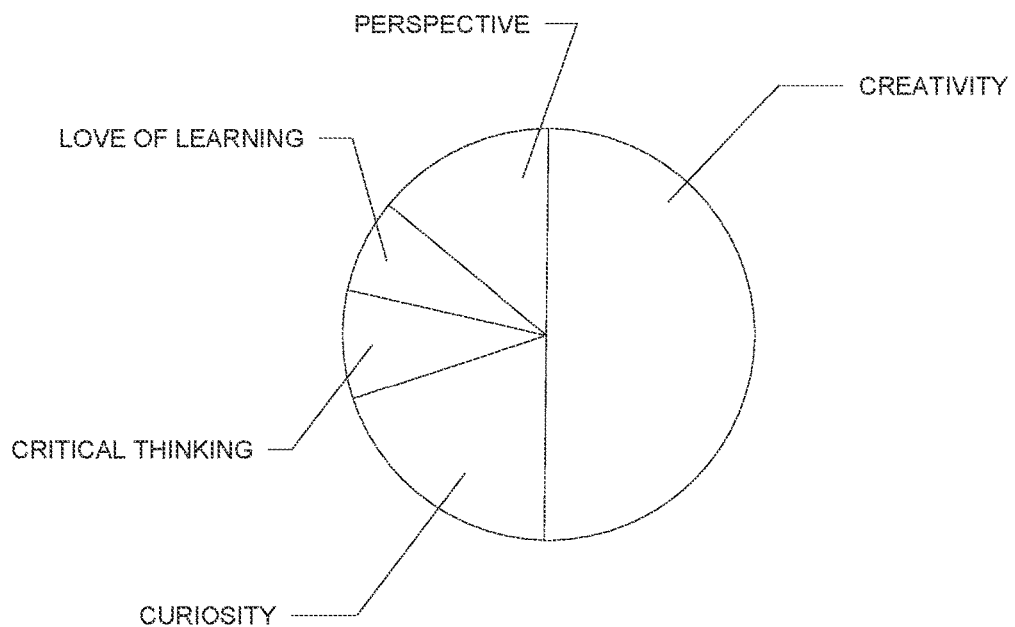
FIG. 3 is an exemplary Wisdom and Knowledge patch showing the Five Subcategories of Wisdom and Knowledge in progress of the embodiment of the present invention.
Figure 4:
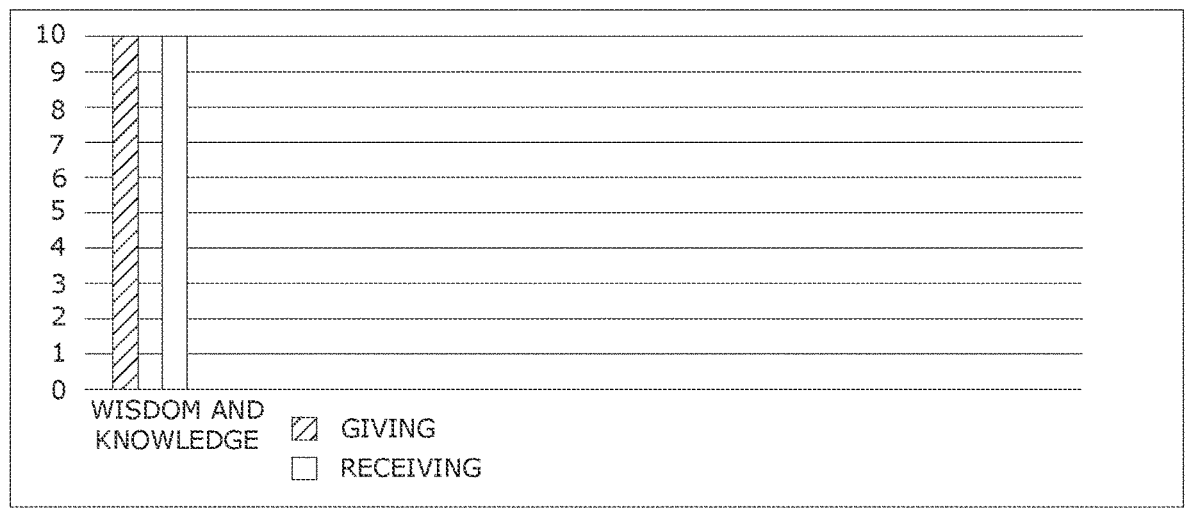
FIG. 4 is an exemplary online portal view of a complete patch showing the balance of both giving and receiving in the Wisdom and Knowledge domain of the embodiment of the present invention.

All transactions like these are recorded on the central server 120, resulting in an accumulation of "care units" for the first person. The central server 120 defines and relates current and past exchanges of care units, and allows access and engagement on an individual level for all participants. The first person can view the care units accumulated on the Built with Love platform that is hosted on the central server 120. FIGS. 2 and 4 are exemplary graphical user interfaces (GUIs) that can be seen on a user device 110 generated by the platform. FIG. 2 illustrates "care units" earned in six exemplary categories. It will be appreciated that the. Each individual has access to an infinite number of care units from which to give. Giving has very little to do with receiving. A person can give more than they receive but the platform encourages an equal amount of giving and receiving in order to promote equity in development and completion of a level or category. Each subcategory is sub divided into ten levels as are each principal category.

By way of example, at the point in time associated with the GUI shown in FIG. 2, the first person has received two wisdom care units, four courage care units, etc., and given four wisdom care units, two courage care units, etc.

As tracked by the platform, participants (e.g., the first and second persons) attempt to complete at least one level of one work category. The levels are simply subdivisions in $\frac{1}{10}^{th}$ increments of the total category expected attainment/goal. They may be noted by level one, two, etc. as a means of tracking progress. As shown in FIG. 4, the work categories are completed by balancing a set volume of giving and receiving care units. For example, FIG. 4 shows the wisdom and knowledge category being completed by the first person by giving ten care units to others (for work done or via donations) and also receiving ten care units from work done for others. This value (e.g., ten units) can, of course, be changed, and is chosen to illustrate the principles of the present invention. Ultimately, the person's life work is recorded within the six established categories (Wisdom/Knowledge, Courage/Bravery, Humanity, Justice, Temperance, Transcendence) and 24 subcategories (described in greater detail at the end of the present disclosure). A person might be awarded care units for work in the area of Curiosity for example if they completed a course in a topic at school which required projects with unique problem-solving approaches to current social or practical issues. Similarly, a person might be awarded care units in the category of Bravery for their work volunteering at a local fire department or for reporting of unethical behavior at a company in which they work. The platform of the present invention thus enables an individual to track their individual growth and contribution to society. Specifically, their care units increase in the respective categories is representative of their contributions both in work done for others, but also in opportunities given to others to earn care units (which results in care units being awarded). Additionally, incentives can be provided as secondary rewards for participation. Inherently, the nature of work and expectations placed on personal growth and societal contribution are in themselves rewarding and intrinsically validating/purposeful.

In use, a participant would open a Built with Love account which tracks and displays exchanges of care units and fulfillment categories. The participant would begin exchanging work with other participants. This work would fall into two domains (Giving or Receiving). The participant may manage their account by balancing the amount of giving and receiving done in each of the below-listed work classification categories. Work and value (Cares) would be submitted by verification of both participants. Each individual affirms the submission and the network corroborates the information and posts it (similar to how a bank designates a deposit). Attainment of predefined volumes of giving and receiving may be rewarded by members collectively. For example, a reward may be a vacation, a luxury item, or recognition. Rewards are provided for, not paid for. Those providing the reward are, for example, working in the hospitality business arena and generally earning care units in Humanity or Transcendence and they are recognized for that work by being awarded care units in those areas.

As those with skill in the art will appreciate, the idea of valuing the exchange for its inherent value, or catalyzing exchanges based on the desire for valuable exchanges rather than an ascribed symbolic value can be utilized in any process of exchange not limited to information, material, perceptual. The present invention may also have applications in artificial intelligence, social construction, material processing, and resource conservation.

The present invention is possible due to, in part, recent advancements in digital currency processes. Following the established procedural model of current digital currency, the present invention changes the specific nature and valuing of the transaction itself. In certain embodiments, the presently described digital currency may be implemented as a digital blockchain that records and classifies each transaction (either Received or Expressed/Given) between persons or institutions.

Figure 6:
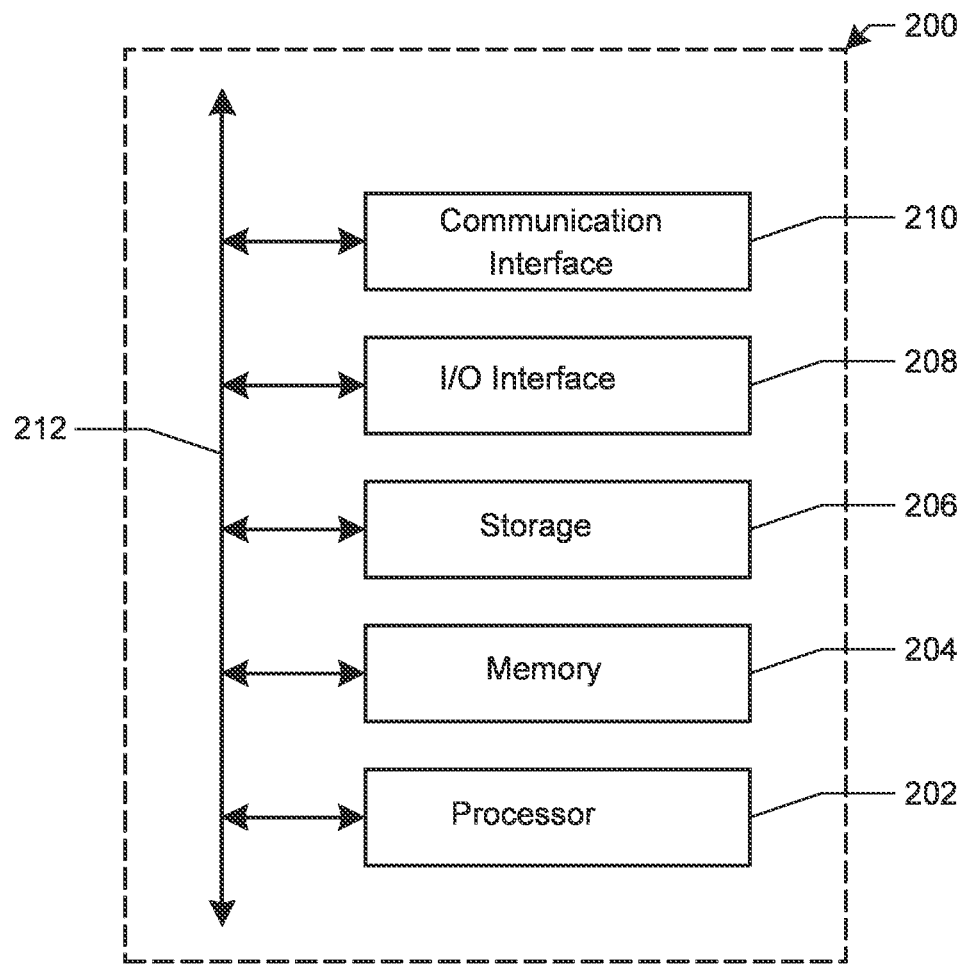
FIG. 6 is an exemplary computer system of the embodiment of the present invention.

Principally, the Built With Love network operates like a bank account, wherein credits and debits are recorded and verified and accessible for credit verification. FIG. 6 illustrates an example of a computing system 200. In certain embodiments, at least one computing system 200 performs at least one step of at least one method described or illustrated herein. In certain embodiments, at least one computing system 200 provides the functionality detailed. In certain embodiments, software running on at least one computing system 200 performs at least one step of at least one method detailed herein or provides functionality detailed herein. Certain embodiments include one or more portions of one or more computing systems 200. As used herein, reference to a computing system may include a computing device, and vice versa, where appropriate. Further, reference to a computing system may include one or more computing systems, where appropriate.

The present disclosure envisions any suitable number of computing systems 200 to implement the above-discussed system 100. It also contemplates computing system 200 taking any appropriate physical form. In exemplary embodiments, computing system 200 may be a desktop computer system, an embedded computer system, a laptop computer system, a mobile telephone (e.g., a smartphone), a PDA, a mainframe, a server, a tablet computing device, or combinations thereof. Where appropriate, the computing system 200 may include one or more computing systems 200; be unified or distributed; be provided in multiple locations; be provided across a plurality of machines; be provided across a plurality of data centers; or reside in a cloud (which may include at least one cloud component in at least one network). Where appropriate, one or more computing systems 200 may perform without substantial temporal or spatial limitation at least one step of one or more methods/processes detailed herein.

In certain embodiments, computing system 200 includes a processor 202, memory 204, storage 206, an input/output (I/O) interface 208, a communication interface 210, and a bus 212. The present disclosure contemplates any suitable computer system having any suitable number of any suitable components in any suitable arrangement. In certain embodiments, processor 202 includes hardware for executing instructions, such as those that define a computer program, and the present disclosure envisions use of any processor suitable to perform the functions discussed. In certain embodiments, memory 204 includes main memory for storing processor instructions for execution or data for processor 202 to operate on, and the present disclosure envisions any suitable memory. In certain embodiments, storage 206 includes mass storage for data or instructions, and the present disclosure envisions any suitable storage. In certain embodiments, I/O interface 208 includes software, hardware, or both, providing one or more interfaces for communication between computing system 200 and one or more I/O devices. Computing system 200 may include one or more of these I/O devices, where appropriate. One or more of these I/O devices may facilitate communication between a computing system 200 and a user. The present disclosure envisions any suitable I/O interface. In certain embodiments, communication interface 210 includes software, hardware, or both providing one or more interfaces for communication between computing system 200 and one or more other computing systems 200 or one or more networks 150. The present disclosure envisions any appropriate network 150 (e.g., a wireless or wired network) and any appropriate communication interface 210 for it. In certain embodiments, bus 212 includes software, hardware, or both coupling components of computing system 200 to each other, and this disclosure contemplates any appropriate bus (or other form of interconnection).

As referenced above, embodiments of the present invention utilize the VIA Classification of Character Strengths & Virtues, incorporated herein by reference, and which are inherent categories of human functioning, to make up "Built With Love" work categories. The following is a listing of those classifications that form the work categories discussed.

1. Wisdom and Knowledge—Cognitive Strengths that Entail the Acquisition and Use of Knowledge
   Creativity [originality, ingenuity]: Thinking of novel and productive ways to conceptualize and do things; includes artistic achievement but is not limited to it.
   Curiosity [interest, novelty-seeking, openness to experience]: Taking an interest in ongoing experience for its own sake; finding subjects and topics fascinating; exploring and discovering.
   Judgment [critical thinking]: Thinking things through and examining them from all sides; not jumping to conclusions; being able to change one's mind in light of evidence; weighing all evidence fairly.
   Love of Learning: Mastering new skills, topics, and bodies of knowledge, whether on one's own or formally; obviously related to the strength of curiosity but goes beyond it to describe the tendency to add systematically to what one knows.
   Perspective [wisdom]: Being able to provide wise counsel to others; having ways of looking at the world that make sense to oneself and to other people.

2. Courage—Emotional Strengths that Involve the Exercise of Will to Accomplish Goals in the Face of Opposition, External or Internal
   Bravery [valor]: Not shrinking from threat, challenge, difficulty, or pain; speaking up for what is right even if there is opposition; acting on convictions even if unpopular; includes physical bravery but is not limited to it.
   Perseverance [persistence, industriousness]: Finishing what one starts; persisting in a course of action in spite of obstacles; "getting it out the door"; taking pleasure in completing tasks.
   Honesty [authenticity, integrity]: Speaking the truth but more broadly presenting oneself in a genuine way and acting in a sincere way; being without pretense; taking responsibility for one's feelings and actions.
   Zest [vitality, enthusiasm, vigor, energy]: Approaching life with excitement and energy; not doing things halfway or halfheartedly; living life as an adventure; feeling alive and activated.

3. Humanity—Interpersonal Strengths that Involve Tending and Befriending Others
   Love: Valuing close relations with others, in particular those in which sharing and caring are reciprocated; being close to people.
   Kindness [generosity, nurturance, care, compassion, altruistic love, "niceness"]: Doing favors and good deeds for others; helping them; taking care of them.
   Social Intelligence [emotional intelligence, personal intelligence]: Being aware of the motives and feelings of other people and oneself; knowing what to do to fit into different social situations; knowing what makes other people tick.

4. Justice—Civic Strengths that Underlie Healthy Community Life
   Teamwork [citizenship, social responsibility, loyalty]: Working well as a member of a group or team; being loyal to the group; doing one's share.
   Fairness: Treating all people the same according to notions of fairness and justice; not letting personal feelings bias decisions about others; giving everyone a fair chance.
   Leadership: Encouraging a group of which one is a member to get things done, and at the same time maintaining good relations within the group; organizing group activities and seeing that they happen.

5. Temperance—Strengths that Protect Against Excess

Forgiveness: Forgiving those who have done wrong; accepting the shortcomings of others; giving people a second chance; not being vengeful.

Humility: Letting one's accomplishments speak for themselves; not regarding oneself as more special than one is.

Prudence: Being careful about one's choices; not taking undue risks; not saying or doing things that might later be regretted.

Self-Regulation [self-control]: Regulating what one feels and does; being disciplined; controlling one's appetites and emotions.

6. Transcendence—Strengths that Forge Connections to the Larger Universe and Provide Meaning Appreciation of Beauty and Excellence [awe, wonder, elevation]: Noticing and appreciating beauty, excellence, and/or skilled performance in various domains of life, from nature to art to mathematics to science to everyday experience.

Gratitude: Being aware of and thankful for the good things that happen; taking time to express thanks.

Hope [optimism, future-mindedness, future orientation]: Expecting the best in the future and working to achieve it; believing that a good future is something that can be brought about.

Humor [playfulness]: Liking to laugh and tease; bringing smiles to other people; seeing the light side; making (not necessarily telling) jokes.

Spirituality [faith, purpose]: Having coherent beliefs about the higher purpose and meaning of the universe; knowing where one fits within the larger scheme; having beliefs about the meaning of life that shape conduct and provide comfort.

While one or more preferred embodiments are disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

While apparatuses and methods are described in terms of "comprising," "containing," or "including" various components or steps, the apparatuses and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

Moreover, the use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The computer-based data processing system and method described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system or run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

What is claimed is:

1. A non-monetary digital currency system comprising:
a central server;
a plurality of user devices configured to communicate with the central server, each of the plurality of user devices configured to:
transmit, from a first user device to the central server via a network portal, a first recordation that work has been completed by a first user for a second user, wherein the work is classified in one category of a pre-determined group of categories comprising wisdom, courage, humanity, justice, temperance, and transcendence, and transmit, from a second user device to the central server via a network portal, a second recordation that work has been received by a second user, wherein the central server is configured to:
receive the first recordation that work has been completed and the second recordation that work has been received;
validate that the first recordation matches the second recordation;
classifying the work in one category of the pre-determined group of categories comprising wisdom, courage, humanity, justice, temperance, and transcendence;
determining a value of the work based the predetermined group of categories, the value comprising a number of non-monetary digital currency care units;
transmit, to the second user, a bill corresponding to the number of non-monetary digital currency care units;
transmit, as a payment, the number of non-monetary digital currency care units from the second user to the first user based on the work completed; and
record the number of non-monetary digital currency units in the one category of the pre-determined group of categories, the recording comprising:
allocating receiving, in a first digital record associated with the first user, the number of non-monetary digital currency care units to the first user in the one category, and
allocating giving, in a second digital record associated with the first user, the number of non-monetary digital currency care units to the second user in the one category.

2. The non-monetary digital currency system of claim 1, wherein the non-monetary digital currency is works-based.

3. The non-monetary digital currency system of claim 1, wherein, for the first user, each category of the pre-determined group of categories is completable by receiving and transmitting a pre-determined number of the non-monetary digital currency care units.

4. The non-monetary digital currency system of claim 3, wherein the pre-determined number is ten thousand.

* * * * *